(12) United States Patent
Pohl

(10) Patent No.: US 10,802,000 B2
(45) Date of Patent: Oct. 13, 2020

(54) METHOD OF CALIBRATING A CHROMATOGRAPHY SYSTEM

(71) Applicant: Christopher A. Pohl, Union City, CA (US)

(72) Inventor: Christopher A. Pohl, Union City, CA (US)

(73) Assignee: Dionex Corporation, Sunnyvale, CA (US)

( * ) Notice: Subject to any disclaimer, the term of this patent is extended or adjusted under 35 U.S.C. 154(b) by 0 days.

(21) Appl. No.: 13/834,883

(22) Filed: Mar. 15, 2013

(65) Prior Publication Data

US 2014/0260509 A1    Sep. 18, 2014

(51) Int. Cl.
*G01N 30/02* (2006.01)
*G01N 30/86* (2006.01)

(52) U.S. Cl.
CPC ......... *G01N 30/02* (2013.01); *G01N 30/8665* (2013.01); *G01N 30/8668* (2013.01)

(58) Field of Classification Search
CPC ............ G01N 30/02; G01N 2030/027; G01N 2030/045; G01N 2030/047; G01N 30/8631; G01N 30/8637; G01N 30/8665; G01N 30/8668
USPC ......................................................... 73/1.02
See application file for complete search history.

(56) References Cited

U.S. PATENT DOCUMENTS

| | | | |
|---|---|---|---|
| 4,657,729 A | 4/1987 | Bunch et al. | |
| 4,999,098 A | 3/1991 | Pohl et al. | |
| 5,760,394 A | 6/1998 | Welle | |
| 5,804,142 A * | 9/1998 | Ito | G01N 30/88 210/198.2 |

(Continued)

FOREIGN PATENT DOCUMENTS

| | | |
|---|---|---|
| CN | 101226178 A | 7/2008 |
| CN | 101266233 B | 9/2008 |

(Continued)

OTHER PUBLICATIONS

Restek, Material Safety Data Sheet Sulfur Simulated Distillation Standard, http://www.restek.com/documentation/msds/33049_useng.pdf, Jul. 24, 2008.*

(Continued)

*Primary Examiner* — Peter J Macchiarolo
*Assistant Examiner* — Alex Mercado
(74) *Attorney, Agent, or Firm* — David A. Schell; Timothy J. Ohara

(57) ABSTRACT

A method of calibrating, a chromatography system is described. The method includes injecting a standard into a chromatographic separator. The standard including a first analyte having a first calibrant concentration and a second analyte having a second calibrant concentration. The standard can be separated in the chromatographic separator and measured with a detector. The method automatically identifies whether the first peak corresponds to the first analyte or the second analyte and whether the second peak corresponds to the first analyte or the second analyte, based on either an area or a peak height of the first peak and the second peak, and a ratio based on the first calibrant concentration and the second calibrant concentration.

10 Claims, 5 Drawing Sheets

(56) References Cited

U.S. PATENT DOCUMENTS

| | | | |
|---|---|---|---|
| 5,905,192 | A | 5/1999 | Wikfors et al. |
| 5,969,228 | A | 10/1999 | Gorenstein |
| 6,225,129 | B1 | 5/2001 | Liu et al. |
| 6,239,139 | B1 * | 5/2001 | Kim et al. ................ 514/280 |
| 6,328,885 | B1 | 12/2001 | Srinivasan et al. |
| 6,544,484 | B1 | 4/2003 | Kaufman et al. |
| 6,568,245 | B2 | 5/2003 | Kaufman |
| 6,682,701 | B1 | 1/2004 | Liu et al. |
| 7,178,386 | B1 | 2/2007 | Gamble et al. |
| 7,329,346 | B2 | 2/2008 | Liu et al. |
| 8,043,507 | B2 | 10/2011 | Liu et al. |
| 8,415,168 | B2 | 4/2013 | Liu et al. |
| 2003/0110000 | A1 | 6/2003 | Quimby et al. |
| 2004/0258617 | A1 | 12/2004 | Weber et al. |
| 2006/0255258 | A1 | 11/2006 | Wang et al. |
| 2007/0112534 | A1 | 5/2007 | Jaeger |
| 2008/0072664 | A1 * | 3/2008 | Hansen et al. ............ 73/61.71 |
| 2008/0110232 | A1 | 5/2008 | Miyagawa |
| 2008/0237457 | A1 | 10/2008 | Yamashita |
| 2009/0218238 | A1 | 9/2009 | Dasgupta et al. |
| 2010/0299078 | A1 * | 11/2010 | Guieze ........................ 702/24 |
| 2011/0184648 | A1 * | 7/2011 | Gorenstein et al. .......... 702/19 |
| 2012/0156710 | A1 | 6/2012 | Nakayama et al. |
| 2014/0088923 | A1 | 3/2014 | Wang et al. |
| 2014/0156202 | A1 | 6/2014 | Floridia et al. |
| 2014/0260509 | A1 | 9/2014 | Pohl |

FOREIGN PATENT DOCUMENTS

| | | |
|---|---|---|
| CN | 101650347 B | 9/2009 |
| CN | 101738447 A | 6/2010 |
| CN | 102661939 B | 5/2012 |
| EP | 1752766 A1 | 2/2007 |
| EP | 2447712 A3 | 12/2012 |
| JP | 6276458 A | 4/1987 |
| JP | 09269319 A | 10/1997 |
| JP | 2006317198 A | 11/2006 |
| JP | 2007225420 A | 9/2007 |
| JP | 2011117815 A | 6/2011 |
| WO | 2005114220 A2 | 12/2005 |
| WO | 2006110848 A2 | 10/2006 |
| WO | 2009058978 A1 | 5/2009 |
| WO | 2011012659 A2 | 2/2011 |
| WO | 2011155984 A1 | 12/2011 |
| WO | 2012170549 A1 | 12/2012 |
| WO | 2013044401 A1 | 4/2013 |
| WO | 2013181758 A1 | 12/2013 |

OTHER PUBLICATIONS

Dolan, J. W. (Jun. 1, 2012). When Should an Internal Standard be Used? Retrieved Jul. 13, 2016, from http://www.chromatographyonline.com/when-should-internal-standard-be-used-0.*

European Union, The Commission of the European Communities. (2002). Commission Decision of Aug. 14, 2002 implementing Council Directive 96/23/EC concerning the performance of analytical methods and the interpretation of results 2002/657/EC (pp. 1-27).*

Khan and Adewuyi, "A new method of analysis of peroxydisulfate using ion chromatography and its application to the simultaneous determination of peroxydisulfate and other common inorganic ions in a peroxydisulfate matrix," Journal of Chromatography A, 1218, 392-397, 2011.

Liang and Lucy, "Characterization of ion chromatography columns based on hydrophobicity and hydroxide eluent strength," Journal of Chromatography A, 1217, 8154-8160, 2010.

Carell, "New promise in combinatorial chemistry: synthesis, characterization, and screening of small-molecule libraries in solution," Chemistry & Biology, 1995, vol. 2, No. 3, pp. 171-183.

Smiley, Thesis entitled "Chemi-Code: An Innovative Method for Wood Product Tracking," The University of British Columbia, Apr. 2008, 108 pages.

Sequant, "A Practical Guide to Ion Chromatography: An introduction and troubleshooting manual," The Nest Group, Inc., 1998-2007, 23 pages.

Instrumental Analysis (CEM 333) Resource Page, http://www.cem.msu.edu/~cem333/InternalStandard.html, downloaded 2013, 2 pages.

PowerPoint presentation, Internal Standard Calibration, http://www.azdhs.gov/lab/documents/license/resources/calibration-training/04-internal-standard-calib.pdf, website accessed Feb. 12, 2013.

EPA Method 8000C, Rev 3, Mar. 2003, 66 pages.

Deport et al., "Comprehensive combinatory standard correction: A calibration method for handling instrumental drifts of gas chromatography-mass spectrometry systems," J of Chromatography A, 1116, 248-258, 2006.

Jones, "Making an HPLC Calibration work (Part 1)," Chromatography Focus, ILM, Oct. 1, 2009, pp. 103-105.

Quantitative & Qualitative HPLC, Jan. 1, 2014, retrieved from the Internet: URL: http://www.chromacademy.com/lms/sco9/Theory_Of-HPLC-Quantitative_and_Qualitative_HPLC.pdf [retrieved on Sep. 8, 2014].

Understanding Your Agilent ChemStation, Agilent User Manual, Jul. 1, 2009, 272 pages.

Vanatta et al., "Ion-chromatographic quantilation of fluoride and acetate—Statistical comparison of calibration curves from two similar eluents," J. of Chrom. A. 804, 123-129, 1996.

Johnson et al., "High-speed peak matching algorithm for retention time alignment of gas chromatographic data for chemometric analysis," J. of Chromatography A, vol. 996, No. 1-2, pp. 141-155, 2003.

Li et al., "A Method of Fitting and Quick Resolution of Skewed and Overlapped Chromatographic Peaks," Chinese J. of Chromatography, vol. 10, No. 5, 251-254, 1992 (English abstract on last page).

Huang et al., "Determination of Pu in Spent Nuclear Fuel by Ion Chromatographic Separation-Peak Area Ratio Method," J. of Nuclear and Radiochemistry, 29(2), 85-89, 2007 (English abstract on 1st page of reference).

* cited by examiner

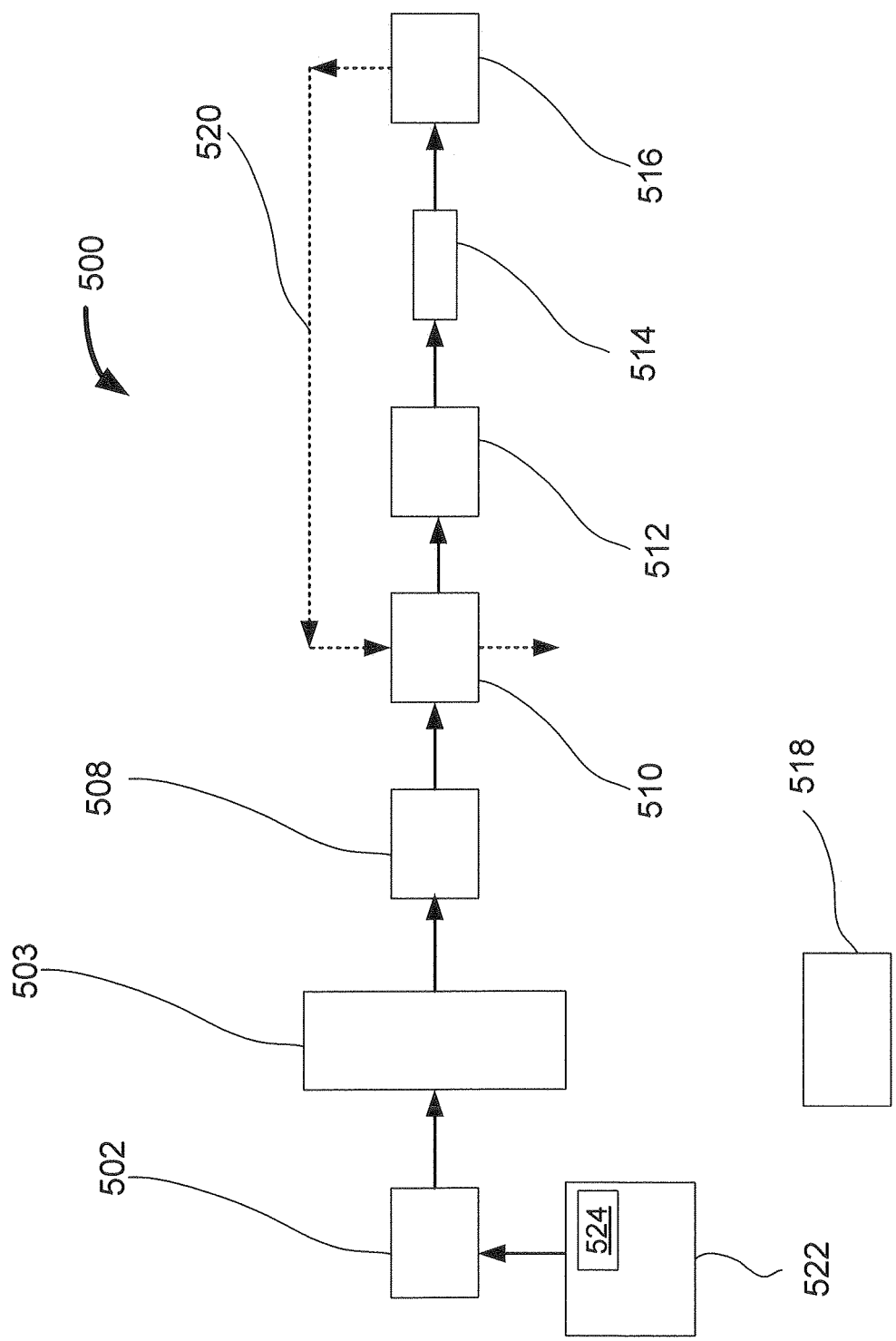

METHOD OF CALIBRATING A CHROMATOGRAPHY SYSTEM

BACKGROUND

Chromatography is a widely used analytical technique for the chemical analysis and separation of molecules. Chromatography involves the separation of one or more analyte species from matrix components present in a sample. The analytes and matrix components have an affinity with a stationary phase. In ion exchange chromatography, the stationary phase is derivatized with ionic moieties that ideally will bind to the charged analytes and matrix components with varying levels of affinity. An eluent is percolated through the stationary phase and competes with the analyte and matrix components for binding to the ionic moieties. The eluent is a term used to describe a liquid or buffer solution that is pumped into a chromatography column. During this competition, the analyte and matrix components will separate from each other by eluting off of the stationary phase as a function of time and then be subsequently detected at a detector. Examples of some typical detectors are a conductivity detector, a UV-VIS spectrophotometer, and a mass spectrometer.

Chromatography columns typically require a calibration process to both identify the analyte and quantitate the amount of analyte. A standard solution is often used as part of a calibration process for determining the chemical identity of the chromatographic peaks of a sample solution. The standard solution can have one or more types of analytes where each one is at a known predetermined concentration. A chromatogram of the standard solution will provide the retention times, peak heights, and peak areas for the analytes in the standard solution. Such information acquired with the standard solution can be compared to the chromatogram of a sample solution to determine the chemical identity and concentration of the components in the sample solution. For instance, the peak retention times of the standard solution can be correlated with the peak retention time of the sample solution to determine the chemical identity of the peaks of the sample chromatogram. In addition, the peak areas of the standard solution can be used to proportionally calculate the analyte concentration of the corresponding peak areas of the sample chromatogram.

The analyte identity and concentration of the standard solution can be entered into a memory portion of a chromatography data system. A software system can then process a sample chromatogram using the inputted parameters of the standard solution. However, Applicant believes that there are several problems with calibration processes that use a standard solution such as changing the chromatography column, which can cause the parameters of the standard solution to no longer be applicable (e.g., a shift in retention time). Other factors that can cause a shift in the inputted parameters are changes in eluent condition, column degradation, and column contamination. As such, Applicant believes that there is a need for an automatic process to identify the chemical identity of particular chromatographic peaks and associated concentrations with a seamless calibration process. Applicant also believes that this seamless and automatic calibration process needs to account for drifts in chromatographic performance and notifying users when the column needs replacement.

SUMMARY

A method of calibrating a chromatography system can include an automatic calibration method with a standard solution, an automatic analysis method with a sample solution, and an automatic re-calibration method. The automatic calibration method includes injecting a standard into a chromatographic separator. The standard includes a first analyte having a first calibrant concentration and a second analyte having a second calibrant concentration. The standard can be separated in the chromatographic separator. A first peak and a second peak that have a first retention time and a second retention time, respectively, can be measured with a detector. Next, the method automatically identifies whether the first peak corresponds to the first analyte or the second analyte and whether the second peak corresponds to the first analyte or the second analyte based on either an area or a peak height of the first peak and the second peak, and a ratio based on the first calibrant concentration and the second calibrant concentration.

In regards to the above method, it can further include calculating a first analyte time interval and a second analyte time interval based on the first retention time and the second retention time. A sample can be injected into the chromatographic separator where the sample includes a first analyte and a second analyte. The sample can be separated in the chromatographic separator. A third peak and a fourth peak that have a third retention time and a fourth analyte retention time, respectively, can be measured with the detector. Next, the method automatically outputs that the third peak corresponds to the first analyte where the third retention time falls within the first analyte time interval or that the third peak corresponds to the second analyte where the third retention time falls within the second analyte time interval. In addition, the method automatically outputs that the fourth peak corresponds to the first analyte where the fourth retention time falls within the first analyte time interval or that the fourth peak corresponds to the second analyte where the fourth retention time falls within the second analyte time interval.

In regards to the above method, the first analyte time interval has a first upper limit and a first lower limit where the first upper limit is the first retention time plus a first predetermined proportion of the first retention time and the first lower limit is the first retention time minus the first predetermined proportion of the first retention time. The first predetermined proportion may range from about 0.05 to about 0.2.

In regards to the above method, the second analyte time interval has a second upper limit and a second lower limit where the second upper limit is the second retention time plus a second predetermined proportion of the second retention time and the second lower limit is the second retention time minus the second predetermined proportion of the second retention time. The second predetermined proportion may range from about 0.05 to about 0.2.

In regards to the above method, it can further include automatically outputting a first analyte concentration and a second analyte concentration of the sample based on an area or a peak height of the first peak, the second peak, the third peak, and the fourth peak.

In regards to the above method, it can further include repeating the step of injecting the standard and repeating the step of separating the standard in the chromatographic separator. A fifth peak and a sixth peak that have a fifth retention time and a sixth retention time, respectively, can be measured with a detector. Next, the first analyte time interval and the second analyte time interval based on the fifth retention time and the sixth retention time may be re-calculated.

In regards to the above method, it can further include outputting a message on a computer screen that the chromatographic separator needs replacement when an absolute difference between the fifth retention time and the first retention time is greater than a first predetermined threshold or an absolute difference between the sixth retention time and the second retention time is greater than a second predetermined threshold.

In regards to the above method, the standard can be contained in a container that has a RFID tag. The RFID tag can be read or polled to determine an identity of the first analyte and the second analyte, and the first calibrant concentration and the second calibrant concentration of the standard.

A method of identifying a type of chromatography column is described. It can include injecting a standard into a chromatographic separator. The standard can include a first analyte having a first calibrant concentration, a second analyte having a second calibrant concentration, and a third analyte having a third calibrant concentration. The standard can be separated in the chromatographic separator. At least two peaks can be measured with a detector, where each one has a retention time, a peak height, and a peak area. Next, the method automatically identifies whether a first peak corresponds to the first analyte, the second analyte, the third analyte, or a combination thereof, whether a second peak corresponds to the first analyte, the second analyte, the third analyte, or a combination thereof, whether a third peak is present and if so whether the third peak corresponds to the first analyte, the second analyte, or the third analyte based on either an area or a height of the measured peaks, and one or more ratios based on the first, second, and third calibrant concentrations. The method also automatically identifies the type of chromatography column based on an elution order of the first, second, and third analytes.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention (wherein like numerals represent like elements).

FIG. 5 illustrates an embodiment of a chromatography system suitable for use with the chromatographic methods described herein.

DETAILED DESCRIPTION OF EMBODIMENTS

Figure 1:
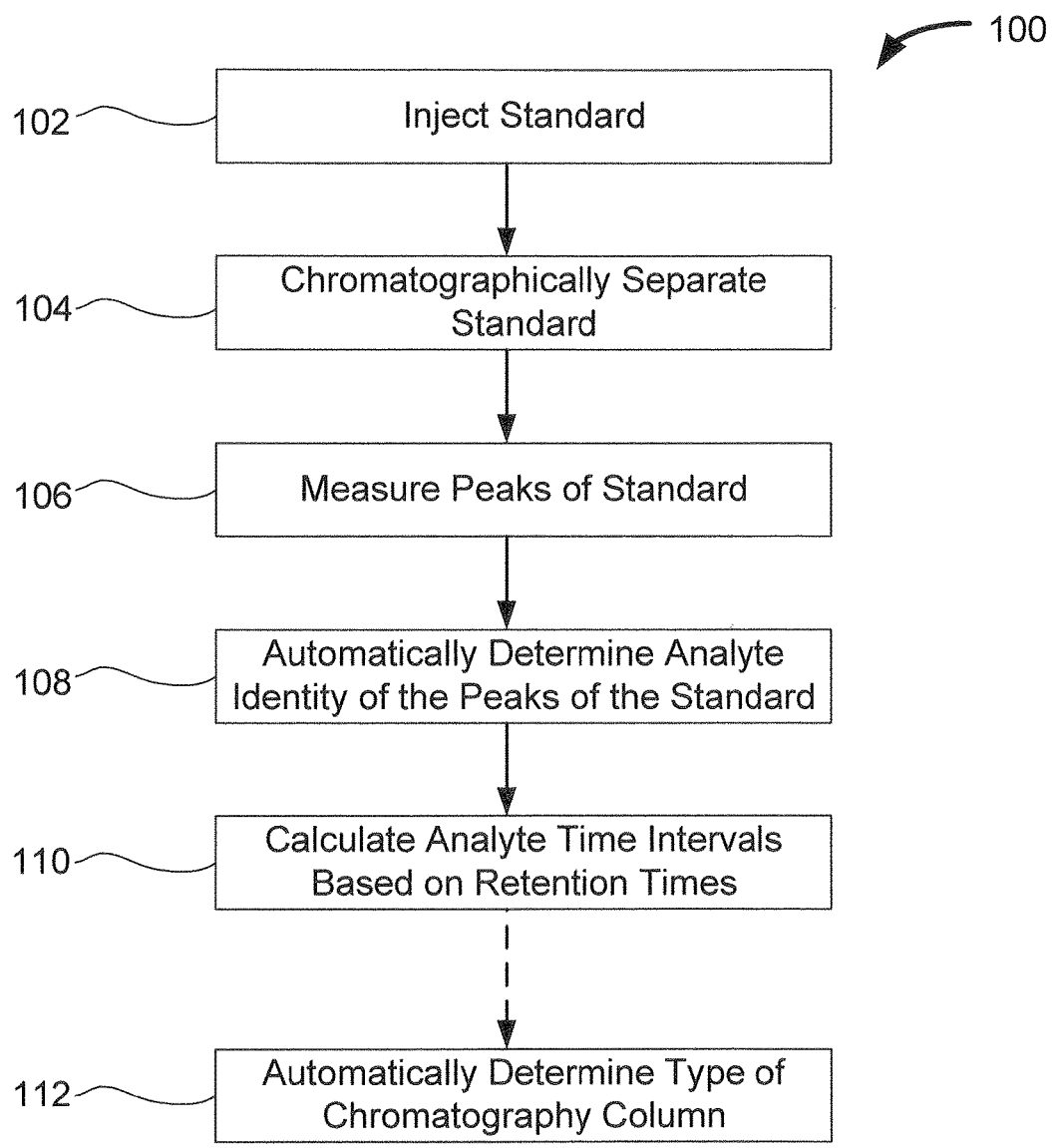
FIG. 1 is a flow chart illustrating an automatic method of calibrating a chromatography system with a standard solution and optionally provides an automatic method of determining the type of chromatography column.

The following detailed description should be read with reference to the drawings, in which like elements in different drawings are identically numbered. The drawings, which are not necessarily to scale, depict selected embodiments and are not intended to limit the scope of the invention. The detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. As used herein, the terms "about" or "approximately" for any numerical values or ranges indicate a suitable dimensional tolerance that allows the part or collection of components to function for its intended purpose as described herein.

Analysis of analytes using chromatography requires input of specifics regarding the analytes into the analysis software. This information frequently needs to be modified due to small differences from one chromatography column to another, changes in eluent condition, or due to changes over time as the column degrades or becomes contaminated. A standard solution can include two or more calibrants that have a precisely controlled ratio of concentration values, which in turn, provide precisely controlled ratios of detector responses. This will allow the software to automatically identify each of the analytes regardless of changes in the column, or contamination of the column during use. The standard solutions described herein may also be referred to as a chemical barcode.

In the course of chromatographic analysis, analyte specifics need to be entered into chromatographic analysis software. Parameters that can be entered include the analyte identity and the analyte concentration. Once these parameters are entered along with suitable integration parameters, analysis software will automatically identify the analytes as part of the analysis reporting. However, it is common for software systems to misidentify analytes. There are several common causes for this. For example, if the parameters are entered for one column and then later a new column is substituted, the parameters entered for the former column may be unsuitable for use with the new column. Frequent adjustment of the analyte parameters is often necessary in the course of the use of chromatographic analysis software. Without such modification, analytical reports will erroneously identify analytes, which constantly requiring vigilance on the part of the analyst to avoid such errors. In addition, when analytical conditions of the separation are changed, such as by modifying the mobile phase or changing the temperature of the separation, the retention characteristics frequently shift enough to require modification of the analyte retention parameters. In addition, as columns degrade or become contaminated through injection of highly retained contaminant impurities, retention can decrease in such a way as to require modification of the analyte retention parameters in order to assure correct identification of analytes by the chromatography analysis software.

A chemical barcode utilizing a defined set of analyte concentrations in a precisely controlled ratio of detector responses will allow software to automatically identify each of the analytes regardless of changes in column, method of contamination of the column during analysis of a standard by using peak area information which is coded in such a way that the chromatography analysis software can automatically identify each analyte in the chromatogram regardless of the retention time or the retention order. For example, if there are four components in the standard and the standard is made up in such a way that the areas of the peaks are: 1000 for peak 1, 2000 for peak 2, 3000 for peak 3 and 4000 for peak 4 then the software looks for an area ratio pattern of 1:2:3:4 to identify the four analytes. Analyte areas are arbitrary, here, and any area ratios can be used provided software can assess the ratio with high enough accuracy to avoid errors caused by operation near the detection limit. If the software also has stored in memory the information that peak 1 equals fluoride (or the peak with an area of 1000=fluoride), peak 2 equals chloride, peak 3 equals bromide and peak 4 equals nitrate then the software can automatically label each peak and identify its location based on the relative areas of each of the peaks.

The following will describe a method of calibrating a chromatography system in more detail. The method of calibrating a chromatography system include an automatic calibration method with a standard solution (FIG. 1), an automatic analysis method with a sample solution (FIG. 2), and an automatic re-calibration method that accounts for sources of drift and changes to chromatographic parameters (FIG. 3).

FIG. 1 is a flow chart illustrating an automatic method 100 of calibrating a chromatography system with a standard solution. Method 100 may include injecting a standard solution (step 102), chromatographically separating a standard (step 104), measuring chromatographic peaks of the standard (step 106), automatically determining analyte identity of the peaks of the standard (step 108), calculating analyte time intervals based on retention times (step 110), and as an optional step automatically determining the type of chromatographic column (step 112).

In step 102, a standard solution can be injected into a chromatography separator. Standard solutions that contain one or more predetermined analytes at precisely controlled concentrations can be used for quality control and calibration of chromatographic systems. The standard solution can include a first analyte having a first calibrant concentration and a second analyte having a second calibrant concentration. In an embodiment, the analyte may be an anion such as fluoride, chloride, bromide, and nitrate. The first and second calibrant concentrations are predetermined so a ratio based on the calibrant concentrations can be calculated.

In an embodiment, a standard solution with four anionic components can include 1 ppm fluoride, 3 ppm chloride, 10 ppm bromide and 10 ppm nitrate. In addition, an example of a seven component anionic standard solution can include 1 ppm fluoride, 3 ppm chloride, 5 ppm nitrite, 10 ppm bromide, 10 ppm nitrate, 15 ppm sulfate and 15 ppm phosphate. An example of a cationic standard solution can include 0.5 ppm lithium, 2 ppm sodium, 2.5 ppm ammonium, 5 ppm potassium, 2.5 ppm magnesium and 5 ppm calcium.

The standard solution can then be separated in a chromatographic separator (step 104). It should be noted that the separation of the sample is a physical transformation of the sample that separates the analytes into discrete boluses of analytes that elute off of the chromatography column. In an embodiment, the detector can be a conductivity detector that measures the conductance of the separated analytes. Typically, the conductance is measured in units of Siemens (S). Once the analytes and matrix components elute off of the column, they can be measured at a detector as signal peaks (step 106). In an embodiment, there can be a first peak P1 and a second peak P2 that have a first retention time t1 and second retention time t2, respectively, as illustrated in chromatogram A of FIG. 4. Note that the peaks P1 and P2 are depicted as lines for simplicity and that the peaks can be of other shapes typically observed in chromatograms such as Gaussian.

Next, method 100 will automatically determine the analyte identity of the peaks of the standard in the standard solution chromatogram (step 108). In other words, the method will determine which peak corresponds to which analyte. For example, the method will automatically identify whether the first peak corresponds to the first analyte or second analyte. Similarly, the method will automatically identify whether the second peak corresponds to the first analyte or second analyte. This automatic identification can be based on an area or a peak height of the first peak and second peak. A ratio based on the second calibrant concentration [A2] and the first calibrant concentration [A1] can be calculated using prior knowledge of the composition of the standard solution before the injection. For example, the ratio value (A2:A1) can be 2 where the second calibrant concentration is a factor of 2 greater than the first calibrant concentration assuming that the detector has the same sensitivity to the first analyte and second analyte per unit concentration. The ratio value can be multiplied by the first peak area to see if the product value corresponds to the second peak area, and if so, the first peak will correspond to the first analyte and the second peak to the second analyte. Similarly, the ratio value can be multiplied by the second peak area to see if the product value corresponds to the first peak area, and if so, the second peak will correspond to the first analyte and the first peak to the second analyte. It should be noted that as described herein that the analyte identity is calculated without using the retention times. This allows the analyte identity to be calculated automatically for more than one type of chromatography column.

Under certain circumstances, a detector signal response can have a different sensitivity to the first analyte A1 than the second analyte A2 in the standard solution. A ratio based on the first calibrant concentration [A1] and the second calibrant concentration [A2] can be calculated using the formula $k \times [A1]/[A2]$ where k=a sensitivity value. For example, a detector can be 10 times more sensitive to the first analyte A1 than the second analyte A2 per unit concentration, and thus, k=10. To configure the standard solution to have a peak area ratio of 2:1 (A1:A2), the second calibrant concentration [A2] needs to be five times greater than the first calibrant concentration [A1]. The ratio of 2 can be calculated using the above formula (e.g., $10 \times 1/5 = 2$). Thus, when performing step 108 and there is different sensitivity to the first analyte A1 and the second analyte A2 at the detector, a ratio based on the calibrant concentrations and the sensitivity value can be calculated to determine analyte identity.

Figure 4:
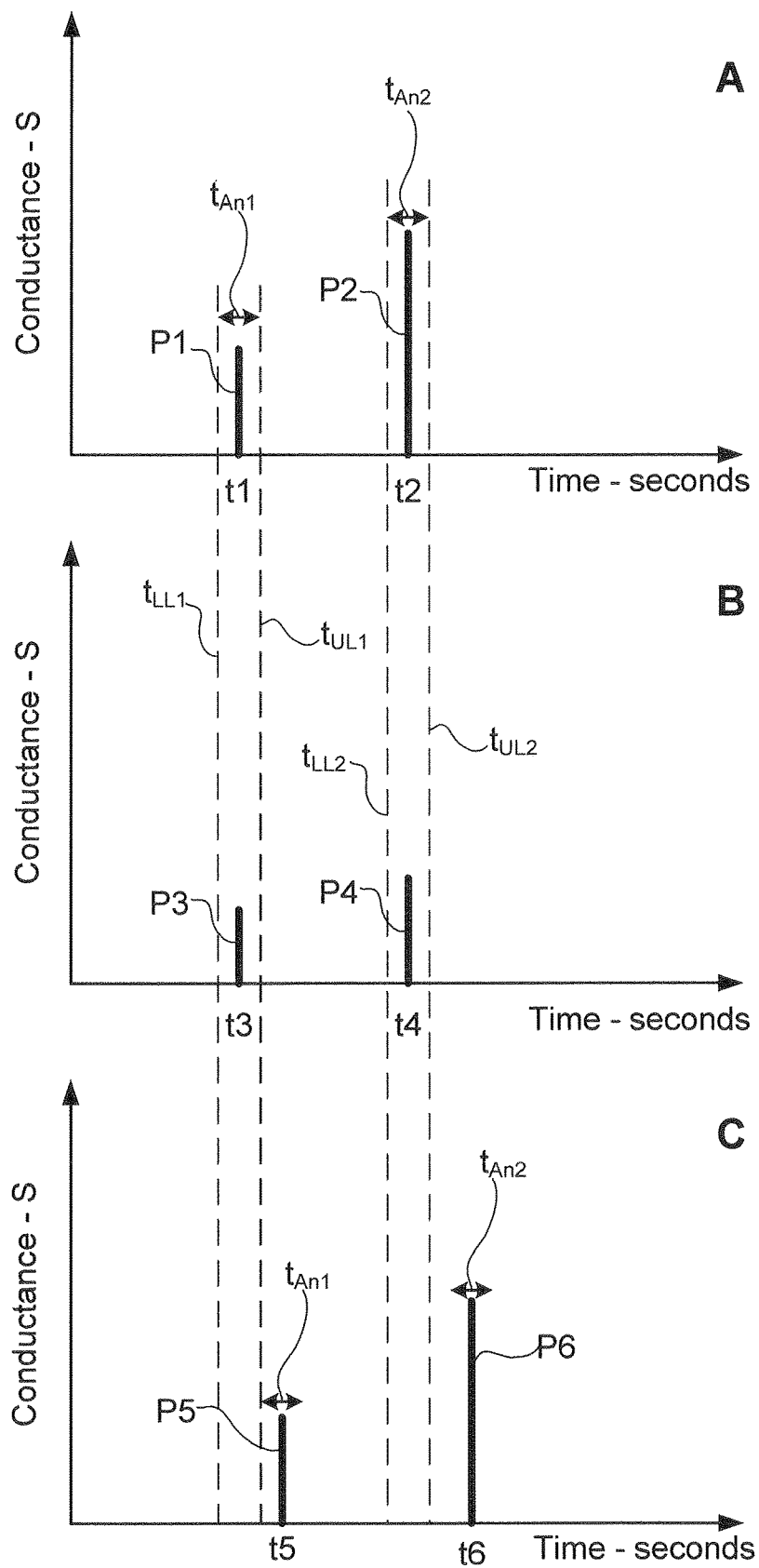
FIG. 4 shows a series of chromatograms for a standard solution (A), a sample solution (B), and a subsequent re-injection of the standard solution (C).

Now that the chemical identities of the peaks of the standard solution have been identified, the analyte time interval can be calculated based on the retention times (step 110). The analyte time intervals can be used to identify the chemical identity of chromatographic peaks of a sample solution. In addition, the analyte time intervals can be used to set the integration parameters to determine the areas under the peaks. A first analyte time interval $t_{AN1}$ and a second analyte time interval $t_{AN2}$ can be calculated based on the first retention time t1 and the second retention time t2, respectively (chromatogram A of FIG. 4). More particularly, the first analyte time interval $t_{AN1}$ can have a first upper limit $t_{UL1}$ and a first lower limit $t_{LL1}$, as illustrated in FIG. 4. The first upper limit $t_{UL1}$ can be the first retention time t1 plus a first predetermined proportion of the first retention time t1 and the first lower limit $t_{LL1}$ can be the first retention time t1 minus the first predetermined proportion of the first retention time t1. In an embodiment, the first predetermined proportion may range from about 0.05 to about 0.2. For example, the first predetermined proportion of the first retention time can be 0.1×t1.

Similar to the first analyte time interval $t_{AN1}$, the second analyte time interval $t_{AN2}$ can have a second upper limit $t_{UL2}$ and a second lower limit $t_{LL2}$, as illustrated in FIG. 4. The second upper limit $t_{UL2}$ can be the second retention time t2 plus a second predetermined proportion of the second retention time t2 and the second lower limit $t_{LL2}$ can be the second retention time t2 minus the second predetermined proportion of the second retention time t2. The second predetermined proportion may range from about 0.05 to about 0.2. For example, the second predetermined proportion of the second retention time can be 0.1×t2.

Figure 2:
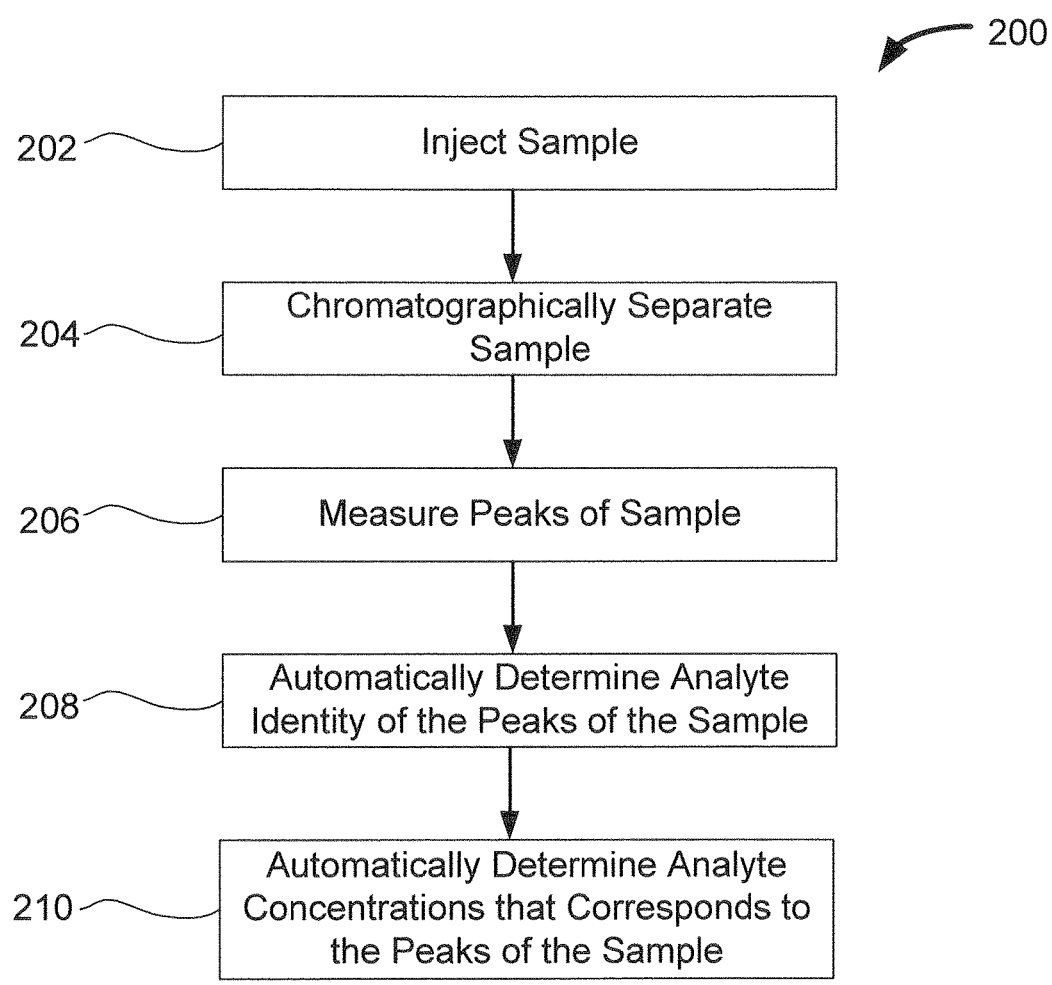
FIG. 2 is a flow chart illustrating a method of chromatographically separating a sample with an automatic method of determining the analyte identity and analyte concentration.
Figure 3:
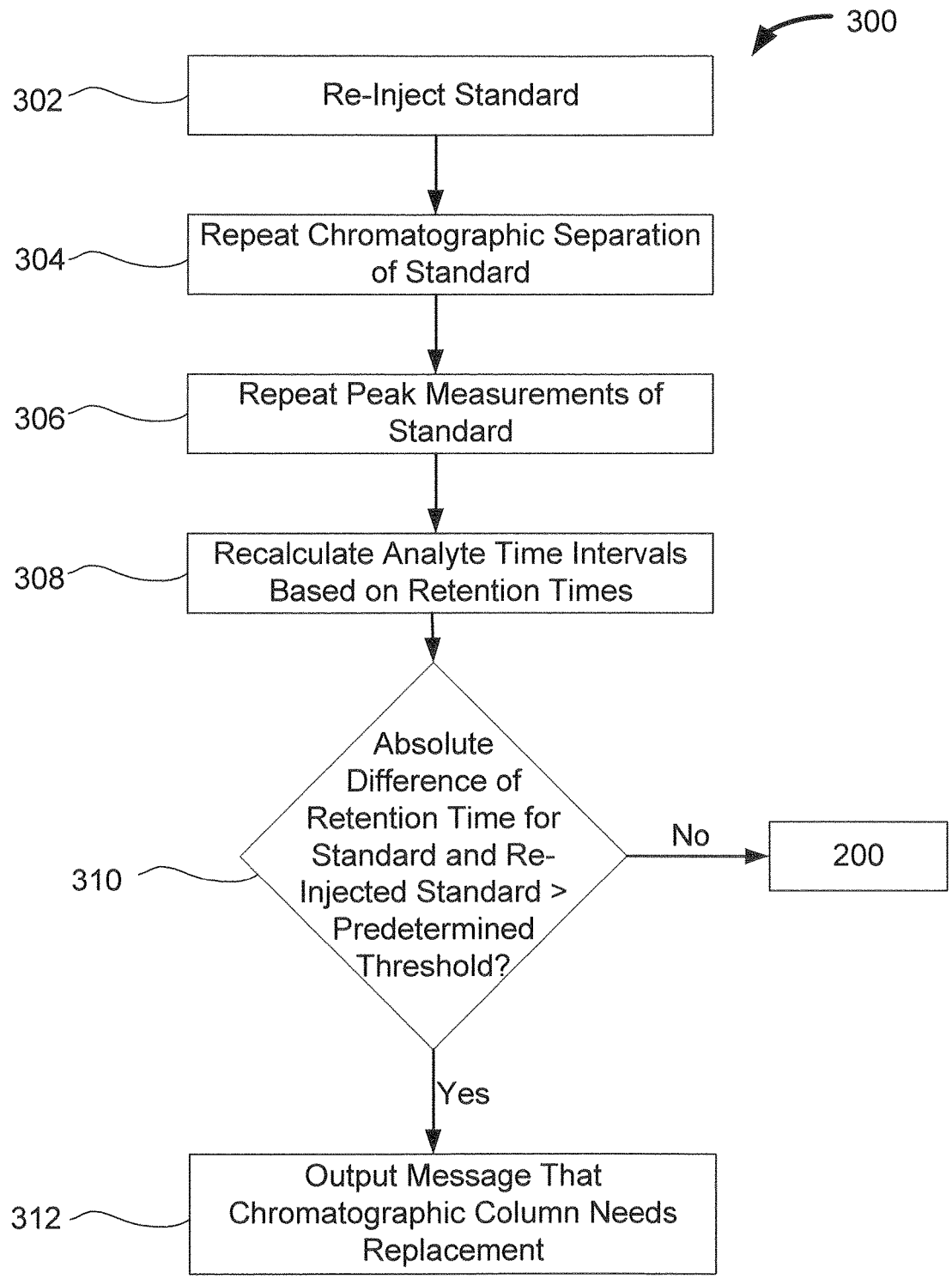
FIG. 3 is a flow chart illustrating an automatic method of re-calibrating a chromatography system that accounts for sources of drift and optionally provides an automatic method of notifying a user when a chromatography column needs replacement.

After step 110, method 100 may transition to an optional step 112 that automatically determines the type of chromatography column or to automatic method 200 that analyzes a sample solution and is shown in FIG. 2. It should be noted that optional step 112 will be described later. As shown in FIG. 2, method 200 may include injecting a sample (step 202), chromatographically separating the sample (step 204), measuring chromatographic peaks of the sample (step 206), automatically determining analyte identity of the peaks of the sample (step 208), and automatically determining the analyte concentrations that corresponds to the peaks of the sample (step 210).

A sample can be injected into the chromatographic separator where the sample includes one or more analytes such as, for example, a first analyte and a second analyte (step 202). The sample can be separated in the chromatographic separator (step 204). The detector can measure the separated analytes with the detector in the form of chromatographic peaks with associated retention times (step 206). In an embodiment as illustrated in chromatogram B of FIG. 4, a third peak P3 and a fourth peak P4 that have a third retention time t3 and a fourth analyte retention time t4, respectively, can be measured with a detector. The system can then automatically determine the analyte identity of the measured peaks when the associated retention time falls within a particular analyte time interval (step 208). Once the analyte identity is determined, it can be outputted to a user through a software user interface.

In the automatic analyte identity determination step 208, the method will determine whether the third peak P3 corresponds to the first analyte where the third retention time t3 falls within the first analyte time interval $t_{AN1}$ or that the third peak P3 corresponds to the second analyte where the third retention time t3 falls within the second analyte time interval $t_{AN2}$. Note that a retention time falls within an analyte time interval where the retention time is greater than $t_{LL}$ and less than the $t_{UL}$. The method will also determine whether the fourth peak P4 corresponds to the first analyte where the fourth retention time falls t4 within the first analyte time interval $t_{AN1}$ or that the fourth peak P4 corresponds to the second analyte where the fourth retention time t4 falls within the second analyte time interval $t_{AN2}$.

Now that the method of determining the analyte identity of the peaks of the sample has been described, the following will describe step 210 that is the method of automatically determining the analyte concentration of the sample peaks. A first analyte concentration and a second analyte concentration of the sample is calculated based on an area or a peak height of the first peak, the second peak, the third peak, and the fourth peak. In many cases, the peak area is used in calculating the analyte concentration where the peak area represents an integration of the signal during the analyte time interval. However, for other cases, it may be more convenient to use the peak height instead of peak area when the peak height can be used to calculate the analyte concentration through regression analysis. In an embodiment, the first and second peak areas can be used to establish the calibration coefficients of the first and second analyte through regression analysis. After the calibration, the third and fourth peak areas can be used to calculate the first and second analyte concentration of the sample using the established calibration coefficients.

After step 210, method 200 may transition to performing method 200 again with another sample injection or it may transition to a recalibration method 300. The method 200 may transition to recalibration method 300 when a predetermined number of sample injections have been performed, after a predetermined amount time of has elapsed, or a chromatographic parameter has been changed such as a column, eluent composition, or temperature. In an embodiment, the predetermined amount of elapsed time since the performance of calibration 100 of the standard may range from 10 minutes to about 8 hours.

As shown in FIG. 3, method 300 may include re-injecting a standard (step 302), repeating the chromatographic separation of the standard (step 304), repeating the measurement of the chromatographic peaks of the standard (step 306), recalculating the analyte time intervals based on the retention times (step 308), and determining the absolute difference of the retention times for the standard and the re-injected standard (step 310). If the absolute difference is not greater than a predetermined threshold, method 300 will flow back to method 200 using the recalculated analyte time intervals. However, if the absolute difference is greater than the predetermined threshold, method 300 will output a message that the chromatographic column needs replacement (step 312). It should be noted that step 310 determines whether the change in retention times is modest and part of regular operational variation consistent with the performance specification of the chromatographic column in which case re-calibration is appropriate. However, the change in retention times can be sufficiently large and outside of normal operational variation and indicative of the need to replace the chromatographic column with a new one. It should be noted that the predetermined threshold may be based on either an absolute difference (e.g., absolute time shift in retention time) or an absolute % difference. For the absolute % difference, it may range from about 5% to about 50% of a particular retention time such as for a key analyte.

In regards to step 306, the detector can measure the separated analytes with the detector in the form of chromatographic peaks with associated retention times. In an embodiment as illustrated in chromatogram C of FIG. 4, a fifth peak P5 and a sixth peak P6 that have a fifth retention time t5 and a sixth analyte retention time t6, respectively, can be measured with a detector.

In regards to step 308, a first analyte time interval $t_{AN1}$ and a second analyte time interval $t_{AN2}$ can be recalculated based on the fifth retention time t5 and the sixth retention time t6, respectively. As illustrated in chromatogram C of FIG. 4, the first analyte time interval $t_{AN1}$ and second analyte time interval $t_{AN2}$ can shift due to drift or other chromatographic parameter changes.

In regards to step 310, a message on a computer screen can be outputted that the chromatographic separator needs replacement when an absolute difference between the fifth retention time t5 and the first retention time t1 is greater than a first predetermined threshold or an absolute difference between the sixth t6 retention time and the second retention time t2 is greater than a second predetermined threshold.

Alternatively, the absolute % difference for P1 can be calculated by subtracting t1 from t5, dividing by t1, multiplying by 100, and taking the absolute value $$\left(\text{i.e.,} \left|\frac{t5-t1}{t1}\right| \times 100\right).$$

The absolute % difference for P2 can be calculated by subtracting t2 from t6, dividing by t2, multiplying by 100, and taking the absolute value $$\left(\text{i.e.,} \left|\frac{t6-t2}{t2}\right| \times 100\right).$$

In addition to changes in analyte retention time, other criteria can be used as a basis for identifying when the column should be replaced. For example, a pair of peaks such as the first and second peaks of FIG. 4 could be required to have a specified minimum resolution, or a specified minimum retention time then the software could automatically notify the user when either of these parameters fell below a factory set minimum or a user settable minimum.

As mentioned earlier, a user can input the calibration parameters associated with the standard solution used in method 100. However, a RFID tag can be used to seamlessly and automatically transfer these parameters. In an embodiment, the standard solution is contained in a container that has a RFID tag. The RFID tag can have a memory portion with the relevant calibration parameters and can transfer the information to the chromatography system. Such information can include the identity of the first analyte and the second analyte, and the first calibrant concentration and the second calibrant concentration. Alternatively, the information could be a part number or numerical code that allows the system to identify the relevant parameters of the standard. The chromatography system may include a RFID reader in the autosampler that can wirelessly interrogate or poll the RFID tag so that the data can be transferred into the system. Alternatively, the standard container could have a storage specified location associated with the instrument so that the instrument would read the information from the standard container automatically once the standard container is placed in a specified standard holder. Furthermore, dilution factors for standards can also be coded into the labeled information so that dilution information would also be automatically loaded into the calibration software.

Referring back to step 112 of FIG. 1, method 100 can also include identifying a type of chromatography column. For example, the type can include an IonPac AS4A-SC column, an IonPac AS12A column, or an IonPac AS14 column (commercially available from Thermo Scientific Dionex, Sunnyvale, Calif., USA). The following will describe method 100 that implements the automatic determination of a type of chromatography column using a standard solution that contains three analytes. The standard solution contains a first analyte having a first calibrant concentration, a second analyte having a second calibrant concentration, and a third analyte having a third calibrant concentration. After separating the standard in the chromatographic separator (step 104), at least two peaks can be measured with a detector where each one has a retention time, a peak height, and a peak area (step 106). Note that there may be only two peaks if two the analytes co-elute. Next, the analyte identity for each of the measured peaks can be automatically determined (step 108). The method will determine the correspondence of the first peak, the second peak, and the third peak (if present) to the particular analytes of the standard solution based on either an area or a height of the measured peaks, and one or more ratios based on the first, second, and third calibrant concentrations. Once the elution order of the analytes in the sample has been determined, the type of chromatography column can be automatically identified (step 112). The elution order represents the serial time ranked sequence of peaks outputted from the chromatography column. Note that the elution order of the analytes for various types of columns can be stored in a memory portion of the chromatography system.

As an example of chromatography column identification, a standard solution can have four analytes. This standard solution has fluoride as a first analyte, chloride as a second analyte, bromide as a third analyte, and nitrate as a fourth analyte. The first, second, third, and fourth analyte have a first, second, third, and fourth analyte concentration, respectively. The second analyte concentration can be two times greater than the first analyte concentration, the third analyte concentration can be three times greater than the first analyte concentration, and the fourth analyte concentration can be four times greater than the first analyte concentration.

It should be noted that the elution order of the analyte peaks can vary depending on the type of chromatographic column. For instance, using a first type of column, the elution order can be fluoride, chloride, bromide, and nitrate with a peak area ratio normalized to fluoride of 1:2:3:4. However, when using a second type of chromatographic column, the elution order can change to fluoride, chloride, nitrate, and bromide with a peak area ratio normalized to fluoride of 1:2:4:3. Because the automatic identification process for identifying the standard solution is based on peak area ratios and not retention times values, the calibration method described herein can be performed with more than one type of chromatographic columns that have different order of elution times.

It should also be noted that the analyte peaks can co-elute depending on the type of chromatographic column. For instance, using a third type of column, two of the four analytes can co-elute. Bromide and nitrate can co-elute together resulting in an elution order of fluoride, chloride, and bromide/nitrate with a peak area ratio normalized to fluoride of 1:2:7.

In the automatic analysis of the above standard solution, numerous permutations can be analyzed for the standard solution chromatogram. Where there are two analytes co-eluting, the automatic analysis can query for the permutations that include 1:2:7, 1:5:4, 3:3:4, 5:2:3, etc. Accordingly, the same standard solution can be used and automatically analyzed on more than one types of chromatography column.

In addition, knowledge of column selectivity parameters and elution order can also enable the combination of the standard information and the retention information for tabulated set of columns with different selectivity to enable the identification of the column type based solely on comparison to this reference information.

Referring back to method 100, the software will need to know the identity of the standard in order for the software to correctly assign the peaks. The standard can be identified numerically by part number or numerical code or the standard could be identified by a barcode or RFID tag. The numerical code, RFID tag or barcode could be presented to the instrument prior to calibration of the instrument or the instrument could automatically read the RFID tag or barcode if such information were located on the autosampler vial containing the standard. Alternatively, the standard container could have a storage specified location associated with the instrument so that the instrument would read the information from the standard container automatically once the standard container is placed in a specified standard holder. Furthermore, dilution factors for standards can also be coded into the standard information so that dilution information would also be automatically loaded into the calibration software.

The following describes a general chromatography system suitable for use with the inventions described herein. FIG. 5 illustrates an embodiment of chromatography system 500 that includes an autosampler 522, a pump 502, an electrolytic eluent generating device 503, a catalytic elimination device 508, a degas assembly 510, an injection valve 512, a chromatographic separation device 514, a detector 516, a microprocessor 518, and an RFID reader 524. A recycle line 520 may be used to transfer the liquid from an output of detector 516 to an inlet of degas assembly 510.

Pump 502 can be configured to pump a liquid from a liquid source and be fluidically connected to electrolytic eluent generating device 503. Electrolytic eluent generating device 503 is configured to generate an eluent such as for example KOH or methanesulfonic acid. Catalytic elimination device 508 is configured to remove gases through a catalytic reaction. Catalytic elimination device 508 may include a catalyst such as, for example, platinum or other materials capable of combining hydrogen and oxygen into water and decomposing hydrogen peroxide and ozone. Details regarding catalytic elimination devices can be found in U.S. Pat. Nos. 7,329,346 and 8,043,507, which are hereby incorporated by reference herein. Degas assembly 510 may be used to remove residual gas that is not removed by catalytic elimination device 508. In an embodiment, a residual gas may be carbon dioxide, hydrogen, and oxygen. The gas can be swept out of degas assembly 510 using a recycled liquid via a recycle line 520 that is downstream of detector 516. Injection valve 512 can be used to inject a bolus of a liquid sample into an eluent stream. Chromatographic separation device 514 can be used to separate various matrix components present in the liquid sample from the analytes of interest. An output of chromatographic separation device 514 can be fluidically connected to detector 516 to measure the presence of the separated chemical constituents of the liquid sample.

Detector 516 may be in the form of ultraviolet-visible spectrometer, a fluorescence spectrometer, an electrochemical detector, a conductometric detector, a charge detector, or a combination thereof. Details regarding the charge detector that is based on a charged barrier and two electrodes can be found in US Pre-Grant Publication No. 20090218238, which is hereby fully incorporated by reference herein. For the situation where recycle line 520 is not needed, detector 516 may also be in the form of a mass spectrometer or a charged aerosol detector. The charged aerosol detector nebulizes the effluent flow and creates charged particles that can be measured as a current proportional to the analyte concentration. Details regarding the charged aerosol detector can be found in U.S. Pat. Nos. 6,544,484; and 6,568,245, which are hereby fully incorporated by reference herein.

An electronic circuit may include microprocessor 518 and a memory portion. Microprocessor 518 can be used to control the operation of chromatography system 500. Microprocessor 518 may either be integrated into chromatography system 500 or be part of a personal computer that communicates with chromatography system 500. Microprocessor 518 may be configured to communicate with and control one or more components of chromatography system such as autosampler 522, RFID reader 524, pump 502, electrolytic eluent generating device 503, injection valve 512, and detector 516. Note that chromatography system 500 is a particular machine used to analyze standard solutions and sample solutions to identify chemical constituents and the associated concentration values.

While preferred embodiments of the present invention have been shown and described herein, it will be apparent to those skilled in the art that such embodiments are provided by way of example only. Numerous variations, changes, and substitutions will now occur to those skilled in the art without departing from the invention. While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. Therefore, to the extent there are variations of the invention, which are within the spirit of the disclosure or equivalent to the inventions found in the claims, it is the intent that this patent will cover those variations as well.

What is claimed is:

1. A method of using a chromatography system, the method comprising:
   automatically assigning peaks of a standard using the chromatography system, the standard comprising: a first analyte having a first predetermined concentration and a second analyte having a second predetermined concentration, the assigning of the peaks comprising:
   injecting the standard into a chromatographic separator;
   separating the standard in the chromatographic separator;
   measuring, with a detector, a first peak and a second peak that have a first retention time and a second retention time, respectively; and
   automatically identifying, with a processor,
      A) whether the first peak corresponds to the first analyte or the second analyte, and
      B) whether the second peak corresponds to the first analyte or the second analyte, where both A) and B) are determined without using retention time and are based on
         a) either an area or a peak height of the first peak and the second peak, and
         b) a ratio based on the first predetermined concentration and the second predetermined concentration;
   using the processor to automatically determine a first analyte time interval for the first analyte and a second analyte time interval for the second analyte based on the first and second retention times and the identifying the first and second peaks; and
   determining an analyte concentration of a sample, the sample comprising: the first analyte having a first analyte concentration and the second analyte having a second analyte concentration, the determining of the analyte concentration of the sample comprising:

injecting the sample into the chromatographic separator separately from the standard;
separating the sample in the chromatographic separator;
measuring, with the detector, a third peak and a fourth peak that have a third retention time and a fourth analyte retention time, respectively;
automatically assigning, using the processor, the third peak to the first analyte where the third retention time falls within the first analyte time interval or to the second analyte where the third retention time falls within the second analyte time interval;
automatically assigning, using the processor, that the fourth peak to the first analyte where the fourth retention time falls within the first analyte time interval or to the second analyte where the fourth retention time falls within the second analyte time interval;
calculating, using the processor, the first analyte concentration and the second analyte concentration of the sample based on an area or a peak height of the first peak, the second peak, the third peak, and the fourth peak; and
outputting the peak assignment and concentrations for the first and second analytes.

2. The method of claim 1, in which the first analyte time interval has a first upper limit and a first lower limit, the first upper limit being the first retention time plus a first predetermined proportion of the first retention time and the first lower limit being the first retention time minus the first predetermined proportion of the first retention time.

3. The method of claim 2, in which the first predetermined proportion ranges from about 0.05 to about 0.2.

4. The method of claim 2, in which the second analyte time interval has a second upper limit and a second lower limit, the second upper limit being the second retention time plus a second predetermined proportion of the second retention time and the second lower limit being the second retention time minus the second predetermined proportion of the second retention time.

5. The method of claim 4, in which the second predetermined proportion ranges from about 0.05 to about 0.2.

6. The method claim 1, in which the standard is contained in a container, the container having a RFID tag, the method further comprising:
polling the RFID tag to determine an identity of the first analyte and the second analyte, and the first predetermined concentration and the second predetermined concentration.

7. A method of using a chromatography system, the method comprising:
automatically assigning peaks of a standard using the chromatography system, the standard comprising: a first analyte having a first predetermined concentration and a second analyte having a second predetermined concentration, the assigning of the peaks comprising:
injecting the standard into a chromatographic separator;
separating the standard in the chromatographic separator;
measuring, with a detector, a first peak and a second peak that have a first retention time and a second retention time, respectively; and
automatically identifying, with a processor,
A) whether the first peak corresponds to the first analyte or the second analyte, and
B) whether the second peak corresponds to the first analyte or the second analyte, where both A) and B) are determined without using retention time and are based on
a) either an area or a peak height of the first peak and the second peak, and
b) a ratio based on the first predetermined concentration and the second predetermined concentration;
using the processor to automatically determine a first analyte time interval for the first analyte and a second analyte time interval for the second analyte based on the first and second retention time and the identifying the first and second peaks; and
determining an analyte concentration of a sample, the sample comprising: the first analyte having a first analyte concentration and the second analyte having a second analyte concentration, the determining of the analyte concentration of the sample comprising:
injecting the sample into the chromatographic separator separately from the standard;
separating the sample in the chromatographic separator;
measuring, with the detector, a third peak and a fourth peak that have a third retention time and a fourth analyte retention time, respectively;
automatically assigning, using the processor, the third peak to the first analyte where the third retention time falls within the first analyte time interval or to the second analyte where the third retention time falls within the second analyte time interval;
automatically assigning, using the processor, that the fourth peak to the first analyte where the fourth retention time falls within the first analyte time interval or to the second analyte where the fourth retention time falls within the second analyte time interval;
calculating, using the processor, the first analyte concentration and the second analyte concentration of the sample based on an area or a peak height of the first peak, the second peak, the third peak, and the fourth peak; and
outputting the peak assignment and concentrations for the first and second analytes;
repeating the injecting of the standard;
repeating the separating of the standard in the chromatographic separator;
measuring, with the detector, a fifth peak and a sixth peak that have a fifth retention time and a sixth retention time, respectively; and
re-calculating the first analyte time interval and the second analyte time interval based on the fifth retention time and the sixth retention time.

8. The method of claim 7, the method further comprising:
outputting a message on a computer screen that the chromatographic separator needs replacement when an absolute difference between the fifth retention time and the first retention time is greater than a first predetermined threshold or an absolute difference between the sixth retention time and the second retention time is greater than a second predetermined threshold.

9. The method claim 7, further comprising outputting a message that the chromatographic column needs replacement when the absolute difference or an absolute % different between the first or second retention time and the corresponding fifth or sixth retention time is greater than a predetermined threshold.

10. The method claim 9, wherein the absolute % difference is in a range of about 5% to about 50% of a particular retention time.

* * * * *